(12) United States Patent
Qin et al.

(10) Patent No.: US 11,124,589 B2
(45) Date of Patent: Sep. 21, 2021

(54) POLYMERIZATION CATALYST COMPOSITION AND METHOD OF EMPLOYING SAME

(71) Applicant: Bridgestone Corporation, Chuo-ku (JP)

(72) Inventors: Zengquan Qin, Copley, OH (US); James H. Pawlow, Schwenksville, PA (US); Christine M. Rademacher, Akron, OH (US)

(73) Assignee: Bridgestone Corporation, Chuo-ku (JP)

( * ) Notice: Subject to any disclaimer, the term of this patent is extended or adjusted under 35 U.S.C. 154(b) by 62 days.

(21) Appl. No.: 15/517,995

(22) PCT Filed: Oct. 10, 2015

(86) PCT No.: PCT/US2015/055041
§ 371 (c)(1),
(2) Date: Apr. 10, 2017

(87) PCT Pub. No.: WO2016/057985
PCT Pub. Date: Apr. 14, 2016

(65) Prior Publication Data
US 2017/0291977 A1   Oct. 12, 2017

Related U.S. Application Data

(60) Provisional application No. 62/062,308, filed on Oct. 10, 2014.

(51) Int. Cl.
| | |
|---|---|
| *C08F 236/06* | (2006.01) |
| *C08F 136/06* | (2006.01) |
| *C08F 2/60* | (2006.01) |
| *C08F 4/44* | (2006.01) |
| *C08L 9/00* | (2006.01) |

(52) U.S. Cl.
CPC ............. *C08F 236/06* (2013.01); *C08F 2/60* (2013.01); *C08F 4/44* (2013.01); *C08F 136/06* (2013.01); *C08L 9/00* (2013.01); *C08F 2410/01* (2013.01)

(58) Field of Classification Search
None
See application file for complete search history.

(56) References Cited

U.S. PATENT DOCUMENTS

| | | |
|---|---|---|
| 3,297,667 A | 1/1967 | von Dohlen et al. |
| 4,242,232 A | 12/1980 | Sylvester et al. |
| 4,260,707 A | 4/1981 | Sylvester et al. |
| 4,461,883 A | 7/1984 | Takeuchi et al. |
| 4,533,711 A | 8/1985 | Takeuchi et al. |
| 4,575,538 A | 3/1986 | Hsieh et al. |
| 4,663,405 A | 5/1987 | Throckmorton |
| 4,696,984 A | 9/1987 | Carbonaro et al. |
| 4,710,553 A | 12/1987 | Carbonaro et al. |
| 4,736,001 A | 4/1988 | Carbonaro et al. |
| 4,906,706 A | 3/1990 | Hattori et al. |
| 4,990,573 A | 2/1991 | Andreussi et al. |
| 5,064,910 A | 11/1991 | Hattori et al. |
| 5,567,784 A | 10/1996 | Wieder et al. |
| 6,255,416 B1 | 7/2001 | Sone et al. |
| 6,391,990 B1 | 5/2002 | Ishino et al. |
| 6,437,205 B1 | 8/2002 | Miller et al. |
| 6,482,930 B1 | 11/2002 | Kwag et al. |
| 6,521,726 B1 | 2/2003 | Kimura et al. |
| 6,897,270 B2 | 5/2005 | Ozawa et al. |
| 7,008,899 B2 | 3/2006 | Luo et al. |
| 7,094,849 B2 | 8/2006 | Luo et al. |
| 7,288,611 B2 | 10/2007 | Jiang et al. |
| 7,396,889 B2 | 7/2008 | Robert |
| 7,741,418 B2 | 6/2010 | Luo et al. |
| 7,825,201 B2 | 11/2010 | Luo et al. |
| 7,902,309 B2 | 3/2011 | Luo et al. |
| 9,249,244 B2 | 2/2016 | McCauley et al. |
| 2015/0080526 A1* | 3/2015 | Vallieri ................. C08F 136/06 524/571 |

FOREIGN PATENT DOCUMENTS

| | | | | |
|---|---|---|---|---|
| GB | 1065656 | * | 4/1967 | ............... C08D 3/08 |
| JP | JS44-27812 B | | 11/1969 | |
| WO | WO 2013168039 | * | 11/2013 | ............... B60C 1/00 |

OTHER PUBLICATIONS

CNIPA examination report dated Oct. 15, 2018 for CN 201580064935. 9—7 pp. + 6-page translation.

Z. Shen et al., "The Characteristics of Lanthanide Coordination Catalysts and the cis-Polydienes Prepared Therewith," J. Polym. Sci.: Polym. Chem. Ed., vol. 18, pp. 3345-57 (Feb. 1980; John Wiley & Sons, Inc.; New York, NY).

H.L. Hsieh et al., "Polymerization of Butadiene and Isoprene with Lanthanide Catalysts; Characterization and Properties of Homopolymers and Copolymers," Rubber Chem. & Tech., 1985, vol. 58, pp. 117-145 (presented at a May 1984 conference; American Chemical Society; Washington, D.C.).

R.P. Quirk et al., "Butadiene polymerization using neodymium versatate-based catalysts: catalyst optimization and effects of water and excess versatic acid," Polymer, 2000, 41, pp. 5903-5908 (Elsevier Science Ltd.; London, UK).

L. Friebe et al., "Polymerization of 1,3-Butadiene Initiated by Neodumium Versatate/Diisobutylaluminium Hydride/Ethylaluminium Sesquichloride: Kinetics and Conclusions About the Reaction Mechanism," Macromol. Chem. Phys., 2002, 203, pp. 1055-1064 (Wiley-VCH Verlag GmbH & Co.; Weinheim, Germany).

(Continued)

*Primary Examiner* — Yun Qian

(74) *Attorney, Agent, or Firm* — Meredith E. Hooker; David G. Burleson

(57) ABSTRACT

The cis-1,4 mer content of conjugated diene mer in polymers can be increased by adding any of a class of morpholine compounds to a catalyst composition that includes a lanthanide metal atom.

8 Claims, No Drawings

(56) References Cited

OTHER PUBLICATIONS

CNIPA examination report dated Jun. 13, 2019 for CN 201580064935.9—6 pp. + 7-page translation.
JPO examination report dated Oct. 15, 2019 for JP appl. No. 2017-518953.
CNIPA examination report dated Dec. 11, 2019 for CN appl. No. 201580064935.9.

* cited by examiner

POLYMERIZATION CATALYST COMPOSITION AND METHOD OF EMPLOYING SAME

CROSS REFERENCE TO RELATED APPLICATION

This application is a national stage entry of international application no. PCT/US2015/055041, filed 10 Oct. 2015, which claims the benefit of U.S. provisional appl. No. 62/062,308, filed 10 Oct. 2014, the disclosure of which is incorporated herein by reference.

BACKGROUND INFORMATION

Various natural and synthetic elastomeric materials are used in the manufacture of vulcanizates such as, e.g., tire components. Some of the most commonly employed synthetic materials include high-cis polybutadiene, often made by processes employing catalysts, and substantially random styrene/butadiene interpolymers, often made by processes employing free radical or anionic initiators.

Cis-1,4-polydienes having very high cis contents give a greater ability to undergo strain-induced crystallization and lower hysteresis. Vulcanizates made from these polymers tend to exhibit superior physical properties such as higher tensile strength and higher abrasion resistance. The best properties tend to result from cis-1,4-polydienes having a cis content greater than 99% (based on total butadiene mer), particularly those which also have narrow molecular weight distributions, i.e., $M_w/M_n$.

Group 3 (including lanthanides) metal complexes can be used in conjunction with, inter alia, an alkylating agent and a halogen source to provide catalyst compositions. Such compositions are known to be useful for producing polymers having high amounts of cis-1,4 linkages, i.e., above 95% but less than 99%, typically less than 98% and often less than 97%.

Being able to increase the cis-1,4 linkages in polymers made by processes employing lanthanide complex-containing catalyst compositions remains desirable. Being able to do so with compositions and techniques employing compounds that meet regulatory requirements is particularly desirable.

SUMMARY

Any of a class of morpholine compounds can be used as an ingredient of a catalyst composition. The catalyst composition can be used in polymerizations of ethylenically unsaturated hydrocarbon monomers, particularly polyenes and, in certain embodiments, conjugated dienes.

Exemplary morpholine compounds can be represented by the general formula

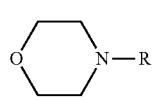

(I)

where R represents H or a functional group bonded to the ring N atom via a C or Si atom.

Advantageously, morpholine and many substituted morpholine compounds are readily available and deemed acceptable under many regulatory standards.

In other aspects are provided a catalyst composition that includes a formula (I) compound. Methods of making the catalyst composition also are provided.

In a still further aspect is provided a process of polymerizing ethylenically unsaturated hydrocarbon monomers. The method involves contacting the monomers with the aforedescribed catalyst composition. The ethylenically unsaturated hydrocarbon monomers advantageously can include one or more types of polyene, particularly conjugated dienes.

In certain embodiments, the polymerization process can result in preferential incorporation of conjugated diene mer in a cis-1,4 configuration.

Also provided are compositions, including vulcanizates, that include particulate fillers and the resulting polymers, certain embodiments of which may also include terminal functionality, as are methods of providing and using such compositions.

Other aspects of the invention will be apparent to the ordinarily skilled artisan from the detailed description that follows. To assist in understanding that description, certain definitions are provided immediately below, and these are intended to apply throughout unless the surrounding text explicitly indicates a contrary intention:

"polymer" means the polymerization product of one or more monomers and is inclusive of homo-, co-, ter-, tetra-polymers, etc.;

"mer" and "mer unit" both mean that portion of a polymer derived from a single reactant molecule (e.g., ethylene mer has the general formula —$CH_2CH_2$—);

"copolymer" means a polymer that includes mer units derived from two reactants, typically monomers, and is inclusive of random, block, segmented, graft, etc., copolymers;

"interpolymer" means a polymer that includes mer units derived from at least two reactants, typically monomers, and is inclusive of copolymers, terpolymers, tetra-polymers, and the like;

"substituted" means containing a heteroatom or functionality (e.g., hydrocarbyl group) that does not interfere with the intended purpose of the group in question;

"polyene" means a molecule, typically a monomer, with at least two double bonds located in the longest portion or chain thereof, and specifically is inclusive of dienes, trienes, and the like;

"polydiene" means a polymer that includes mer units from one or more dienes;

"lanthanide metal" means any element having an atomic number of 57-71 inclusive, as well as mixtures of rare earth elements obtained from monazite sand, often referred to as "didymium";

"Group 3 metal" means Sc, Y or a lanthanide metal;

"phr" means parts by weight (pbw) per 100 pbw rubber;

"radical" means the portion of a molecule that remains after reacting with another molecule, regardless of whether any atoms are gained or lost as a result of the reaction;

"neutral Lewis base" means a non-ionic compound (or radical) that includes an available pair of electrons;

"aryl" means a phenyl or polycyclic aromatic radical;

"aralkyl" means an alkyl radical that includes an aryl substituent, e.g., a benzyl group;

"non-coordinating anion" means a sterically bulky anion that does not form coordinate bonds with, for example, the active center of a catalyst system due to steric hindrance;

"non-coordinating anion precursor" means a compound
  that is able to form a non-coordinating anion under
  reaction conditions;
"organolanthanide compound" means a compound that
  includes at least one lanthanide metal-carbon bond;
"terminus" means an end of a polymeric chain;
"terminally active" means a polymer with a living or
  pseudo-living terminus; and
"terminal moiety" means a group or functionality located
  at a terminus.

Throughout this document, all values given in the form of percentages are weight percentages unless the surrounding text explicitly indicates a contrary intention. The relevant portion(s) of any specifically referenced patent and/or published patent application are incorporated herein by reference.

DETAILED DESCRIPTION OF ILLUSTRATIVE EMBODIMENTS

As apparent from the foregoing, the catalyst composition can be used to polymerize one or more types of polyene, optionally but in some respects preferably which include at least one type of conjugated diene.

The resulting polymer can be elastomeric, including mer units that themselves include ethylenic unsaturation. Mer units that include ethylenic unsaturation can be derived from polyenes, particularly dienes and trienes (e.g., myrcene). Illustrative polyenes include $C_4$-$C_{30}$ dienes, preferably $C_4$-$C_{12}$ dienes. Preferred among these are conjugated dienes such as, but not limited to, 1,3-butadiene, 1,3-pentadiene, 1,3-hexadiene, 1,3-octadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, and the like.

A polymer that has an overall 1,2-microstructure of no more than 50%, preferably no more than 35%, based on total polyene content is considered to be "substantially linear." For certain end use applications, however, keeping the content of 1,2-linkages to less than 20%, less than 15%, less than 10%, less than 7%, less than 5%, less than 4%, less than 3%, less than ~2%, or even no more than ~1% can be desirable.

Those polyene mer not incorporating into a polymer chain in a 1,2-microstructure can have either a cis or trans isomeric configuration. Polymers that have high cis-1,4-linkage contents, which are desirable for certain end use applications, can be difficult or inefficient to achieve via free radical or anionic (living) polymerizations and, therefore, commonly are prepared by processes using catalysts, as opposed to the initiators employed in living polymerizations. (Microstructure characteristics typically are determined by IR spectroscopy, the details of which are familiar to the ordinarily skilled artisan.)

The present process can provide polymers with polydiene mer having a cis-1,4-linkage content that is at least 1, at least 2, at least 3, or even at least 4 percentage points higher than a polymer made from an otherwise identical catalyst composition but which does not include a general formula (I)-type compound. (Cis-1,4 linkages are relative to total diene mer and are numerical percentages, i.e., based on total number (moles) of such mer.)

The number average molecular weight ($M_n$) of a polymer produced according to the disclosed methods typically is such that a quenched sample exhibits a gum Mooney viscosity ($ML_{1+4}/100°$ C.) of from ~2 to ~150, more commonly from ~2.5 to ~125, even more commonly from ~5 to ~100, and most commonly from ~10 to ~75; the foregoing generally corresponds to a $M_n$ of from ~5,000 to ~250,000 Daltons, commonly from ~10,000 to ~200,000 Daltons, more commonly from ~50,000 to ~150,000 Daltons, and most commonly from ~10,000 to ~125,000 Daltons or even ~10,000 to ~100,000 Daltons. The resulting interpolymer typically has a molecular weight distribution of from 1 to 10, commonly from 1.5 to 7.5, and more commonly from 2 to 5. (Both $M_n$ and $M_w$ can be determined by GPC using polystyrene standards for calibration and appropriate Mark-Houwink constants.)

The foregoing types of polymers can be made by solution polymerization, which affords exceptional control of properties as randomness, microstructure, etc. Solution polymerizations have been performed since about the mid-20th century, so the general aspects thereof are known to the ordinarily skilled artisan; nevertheless, certain aspects are provided here for convenience of reference.

Suitable solvents include those organic compounds that do not undergo polymerization or incorporation into propagating polymer chains (i.e., are inert toward and unaffected by the catalyst composition) and preferably are liquid at ambient temperature and pressure. Examples of suitable organic solvents include hydrocarbons with relatively low boiling points such as aromatic hydrocarbons and (cyclo) aliphatic hydrocarbons. Exemplary polymerization solvents include various $C_5$-$C_{12}$ cyclic and acyclic alkanes (e.g., n-pentane, n-hexane, n-heptane, n-octane, n-nonane, n-decane, isopentane, isohexanes, isooctanes, 2,2-dimethylbutane, cyclopentane, cyclohexane, methylcyclopentane, methylcyclohexane, etc.) as well as their alkylated derivatives, certain liquid aromatic compounds (e.g., benzene, toluene, xylenes, ethylbenzene, diethylbenzene, and mesitylene), petroleum ether, kerosene, petroleum spirits, and mixtures thereof. Other potentially suitable organic compounds that can be used as solvents include high-boiling hydrocarbons of high molecular weights such as paraffinic oil, aromatic oil, or other hydrocarbon oils that are commonly used to oil-extend polymers. The ordinarily skilled artisan is aware of other useful solvent options and combinations.

The description that follows employs the term "catalyst composition," which is intended to encompass a simple mixture of ingredients, a complex of various ingredients that results from physical or chemical forces of attraction, a chemical reaction product of some or all of the ingredients, or a combination of the foregoing.

Useful catalyst compositions include a compound that includes a Group 3 metal atom (typically a metal complex, preferably a lanthanide metal complex), a catalyst activator and a halogen source (where the activator does not itself contain a halogen atom). The Group 3 metal atom-containing compound can be provided pre-made or can be generated in situ.

Each component of the catalyst composition is discussed separately in the following paragraphs.

The Group 3 metal atom can be in any of a variety of oxidation states that include, but are not necessarily limited to, 0, +2, +3, and +4. In one embodiment, a Group 3 metal atom in the +3 oxidation state can be employed, optionally but preferably bonded to or associated with three atoms or groups, i.e., a trivalent compound. In these and other embodiments, the Group 3 metal atom can be a lanthanide metal atom, particularly Nd or Gd.

Suitable Group 3 metal atom-containing compounds include, but are not limited to, carboxylates such as formates, acetates, (meth)acrylates, valerates, gluconates, citrates, fumarates, lactates, maleates, oxalates, 2-ethylhexanoates, neodecanoates (i.e., carboxylates made from trialkyl carboxylic acids such as Versatic™ acid, available from Momentive Specialty Chemicals Inc.), naphthenates, stearates, oleates, benzoates, picolinates and the like; organophosphates such as any of variety of dialkyl phosphates, dioleyl phosphates, diphenyl and substituted diphenyl phosphates, butyl (2-ethylhexyl)phosphates, (1-methyl-heptyl) (2-ethylhexyl)phosphates, (2-ethylhexyl) (p-nonylphenyl) phosphates and the like; organophosphonates such as any of a variety of $C_4$-$C_{18}$ alkyl phosphonates and alkyl alkylphosponates, oleyl phosphonates, phenyl and substituted phenyl phosphonates and phenyl phenylphosponates, oleyl oleylphosphonates, phenyl phenylphosphonate, mixed alkyl phosphonates, and the like; organophosphinates such as any of a variety of $C_4$-$C_{18}$ alkyl and dialkyl phosphinates, oleyl and dioleyl phosphinates, phenyl and substituted phenyl and diphenyl phosphinates, mixed alkyl phosphinates, and the like; (thio)carbamates such as any of a variety of $C_1$-$C_8$ dialkyl(thio) carbamates, dibenzyl(thio) carbamates and the like; xanthates such as any of a variety of $C_1$-$C_8$ alkyl xanthates, benzyl xanthates and the like; β-diketonates such as acetylacetonates, trifluoroacetylacetonates, hexafluoroacetylacetonates, benzoylacetonates, and 2,2,6,6-tetramethyl-3,5-heptanedionates and the like; alkoxides such as any of a variety of $C_1$-$C_8$ alkyl alkoxides and the like; aryloxides such as phenoxides and substituted phenoxides, naphthoxides and the like; halides; oxyhalides (optionally solubilized with a Lewis base such as THF); pseudo-halides such as cyanides, (thio)cyanates, azides, ferrocyanides and the like; as well as organolanthanide compounds such as those containing cyclopentadienyl ("Cp"), substituted cyclopentadienyl, allyl, and substituted allyl ligands, particularly $Cp_3Ln$, $Cp_2LnR'$, $Cp_2LnCl$, $CpLnCl_2$, $CpLn(cyclooctatetraene)$, $(C_5Me_5)_2LnR'$, $LnR'_3$, $Ln(allyl)_3$, and $Ln(allyl)_2Cl$ where Ln represents a lanthanide atom (or, less preferably, Sc or Y) and R' represents a hydrocarbyl group optionally containing one or more heteroatoms such as, for example, N, O, B, Si, S, and P. For further information on such compounds, the interested reader is directed to U.S. Pat. No. 7,902,309.

The catalyst composition also includes an activator, generally an alkylating agent, which can be considered to be an organometallic compound that can transfer hydrocarbyl groups to another metal. These agents typically are organometallic compounds of electro-positive metals such as Groups IA, IIA, and IIIA metals. Exemplary alkylating agents include organoaluminum compounds such as those having the general formula $AlR^1_oX_{3-o}$ where o is an integer of from 1 to 3 inclusive; each $R^1$ independently is a monovalent organic group, which may contain heteroatoms such as N, O, B, Si, S, P, and the like, connected to the Al atom via a C atom; and each X independently is H, a halogen atom, a carboxylate group, an alkoxide group, or an aryloxide group. In one or more embodiments, each $R^1$ independently can be a hydrocarbyl group such as, for example, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing from a single C atom, or the appropriate minimum number of C atoms to form the group, up to about 20 C atoms. These hydrocarbyl groups may contain heteroatoms including, but not limited to, N, O, B, Si, S, and P atoms. Non-limiting species of organoaluminum compounds within this general formula include trihydrocarbylaluminum compounds such as trimethylaluminum, triethylaluminum, triisobutylaluminum (TIBA), tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylalumi-num, tris(1-methylcyclopentyl)aluminum, tri phenyl aluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum;

dihydrocarbylaluminum hydrides such as diethylaluminum hydride, di-n-propylaluminum hydride, diisopropylaluminum hydride, di-n-butylaluminum hydride, diisobutylaluminum hydride (DIBAH), di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolyl-isobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride;

hydrocarbylaluminum dihydrides such as ethylaluminum dihydride, n-propylaluminum dihydride, isopropylaluminum dihydride, n-butylaluminum dihydride, isobutylaluminum dihydride, and n-octylaluminum dihydride;

dihydrocarbylaluminum carboxylates;

hydrocarbylaluminum bis(carboxylate)s;

dihydrocarbylaluminum alkoxides;

hydrocarbylaluminum dialkoxides;

dihydrocarbylaluminum halides such as diethylaluminum chloride (DEAC), di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropyl aluminum chloride, p-tolyl-n-butylaluminum chloride, p-tolyliso-butylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride;

hydrocarbylaluminum dihalides such as ethylaluminum dichloride (EADC), n-propylaluminum dichloride, isopropylaluminum dichloride, n-butylaluminum dichloride, isobutylaluminum dichloride, and n-octylaluminum dichloride;

dihydrocarbylaluminum aryloxides; and hydrocarbylaluminum diaryloxides.

In certain embodiments, the alkylating agent can include trihydrocarbylaluminum, dihydrocarbylaluminum hydride, and/or hydrocarbylaluminum dihydride.

Other organoaluminum compounds that can serve as activators, i.e., alkylating agents, include but are not limited to dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis-(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, and isobutylaluminum diphenoxide.

Aluminoxanes constitute another class of organoaluminum compounds suitable for use as an activator, i.e., alkylating agent. (These compounds also can serve as activators after the alkylating activity is complete.) This class includes oligomeric linear aluminoxanes and oligomeric cyclic aluminoxanes, formulas for both being provided in a variety of references including, for example, U.S. Pat. No. 8,017,695. (Where the oligomeric type of compound is used as an alkylating agent, the number of moles refers to the number of moles of Al atoms rather than the number of moles of oligomeric molecules, a convention commonly employed in the art of catalyst systems utilizing aluminoxanes.)

Aluminoxanes can be prepared by reacting trihydrocarbylaluminum compounds with water. This reaction can be performed according to known methods such as, for example, (1) dissolving the trihydrocarbylaluminum compound in an organic solvent and then contacting it with water, (2) reacting the trihydrocarbylaluminum compound with water of crystallization contained in, for example, metal salts, or water adsorbed in inorganic or organic compounds, or (3) reacting the trihydrocarbylaluminum compound with water in the presence of the monomer(s) to be polymerized.

Suitable aluminoxane compounds include, but are not limited to, methylaluminoxane (MAO), modified methylaluminoxane (MMAO, formed by substituting ~20 to 80% of the methyl groups of MAO with $C_2$-$C_{12}$ hydrocarbyl groups, preferably with isobutyl groups, using known techniques), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane, and 2,6-dimethylphenylaluminoxane.

Aluminoxanes can be used alone or in combination with other organoaluminum compounds. In one embodiment, MAO and at least one other organoaluminum compound such as diisobutyl aluminum hydride can be employed in combination. The interested reader is directed to U.S. Pat. No. 8,017,695 for other examples of aluminoxanes and organoaluminum compounds employed in combination.

Also suitable as activators (alkylating agents) are organomagnesium compounds such as those having the general formula $R_g^2MgX_{2-g}$ where X is defined as above, g is 1 or 2, and $R^2$ is the same as $R^1$ except that each monovalent organic group is connected to the Mg atom via a C atom. Potentially useful organomagnesium compounds include, but are not limited to, diethylmagnesium, di-n-propylmagnesium, diisopropylmagnesium, dibutyl-magnesium, dihexylmagnesium, diphenylmagnesium, dibenzylmagnesium, hydrocarbylmagnesium hydride (e.g., methylmagnesium hydride, ethylmagnesium hydride, butylmagnesium hydride, hexylmagnesium hydride, phenylmagnesium hydride, and benzylmagnesium hydride), hydrocarbylmagnesium halide (e.g., methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, and benzylmagnesium bromide), hydrocarbylmagnesium carboxylate (e.g., methylmagnesium hexanoate, ethylmagnesium hexanoate, butylmagnesium hexanoate, hexylmagnesium hexanoate, phenylmagnesium hexanoate, and benzylmagnesium hexanoate), hydrocarbylmagnesium alkoxide (e.g., methylmagnesium ethoxide, ethylmagnesium ethoxide, butylmagnesium ethoxide, hexylmagnesium ethoxide, phenylmagnesium ethoxide, and benzylmagnesium ethoxide), and hydrocarbylmagnesium aryloxide (e.g., methylmagnesium phenoxide, ethylmagnesium phenoxide, butylmagnesium phenoxide, hexylmagnesium phenoxide, phenylmagnesium phenoxide, and benzylmagnesium phenoxide).

The catalyst composition also includes a halogen source, a term that includes any substance that includes at least one labile halogen atom. In one embodiment, at least a portion of the halogen source can be provided by either of the other two foregoing components of the catalyst composition, i.e., the Group 3 metal atom-containing compound (e.g., a halide, oxyhalide or organolanthanide) and/or the above-described activator (alkylating agent), when one or both of those compounds contain at least one labile halogen atom.

At least a portion of the halogen source can be in the form of one or more separate and distinct halogen-containing compounds. Various compounds, or mixtures thereof, that contain one or more labile halogen atoms can be employed as the halogen source, with those that have good solubility in hydrocarbon liquids (solvents) being preferred, although those with limited solubility can be suspended in a polymerization system to form the catalytically active species.

Useful halogen-containing compounds that can be employed as at least a portion of the halogen source include, but are not limited to, elemental halogens; mixed halogens such as iodine monochloride, iodine monobromide, iodine trichloride, iodine pentafluoride and the like; hydrogen halides such as HF, HCl, HBr and HI; organic halides such as t-butyl chloride or bromide, allyl chloride or bromide, benzyl chloride or bromide, chloro- or bromo-di-phenylmethane, triphenylmethyl chloride or bromide, benzylidene chloride or bromide, any of variety of alkyltrichlorosilanes and dialkyldichlorosilanes, benzoyl chloride or bromide, propionyl chloride or bromide, methyl chloroformate, methyl bromoformate and the like; inorganic halides such as $PCl_3$, $PBr_3$, $PCl_5$, $POCl_3$, $POBr_3$, $BCl_3$, $BBr_3$, $BF_3$, $SiF_4$, $SiCl_4$, $SiBr_4$, $SiI_4$, $AsCl_3$, $AsBr_3$, $AsI_3$, $SeCl_4$, $SeBr_4$, $TeCl_4$, $TeBr_4$, $TeI_4$ and the like; halides of metals (in any of a variety of oxidations states) such Sn, Al, Sb, Al, Ga, In, Ti, Zn and the like; as well as organometallic halides such as any of a variety of dialkylaluminum chlorides, bromides and fluorides, alkylaluminum dichlorides, dibromides and difluorides, alkylaluminum sesquichlorides, alkylmagnesium chlorides, bromides and iodides, phenylmagnesium chloride or bromide, benzylmagnesium chloride, trialkyltin chlorides and bromides, dialkyltin dichlorides and dibromides, and the like.

Catalyst compositions of the type just described have very high catalytic activity for polymerizing polyenes such as conjugated dienes into stereospecific polymers over a wide range of concentrations and ratios, although polymers having the most desirable properties typically are obtained from systems that employ a relatively narrow range of concentrations and ratios of ingredients. Further, the catalyst composition ingredients are believed to interact to form an active catalyst species, so the optimum concentration for each ingredient can depend on the concentrations of the other ingredients. The following molar ratios are considered to be relatively exemplary for a variety of different systems based on the foregoing ingredients (with alkylating agent representing a preferred type of activator):

alkylating agent to Group 3 metal atom-containing compound: from ~1:1 to ~1000:1, commonly from ~2:1 to ~500:1, typically from ~5:1 to ~200:1;

aluminoxane to Group 3 metal atom-containing compound, specifically equivalents of aluminum atoms in the aluminoxane to equivalents of Group 3 atoms in the complex: from ~5:1 to ~1000:1, commonly from ~10:1 to ~700:1, typically from ~20:1 to ~500:1; and organoaluminum compound to Group 3 metal atom-containing compound: from ~1:1 to ~200:1, commonly from ~2:1 to ~150:1, typically from ~5:1 to ~100:1.

The molecular weight of polymers produced with a catalyst composition that includes a Group 3 metal atom-containing compound can be controlled by adjusting the amount of Group 3 metal atom-containing compound used and/or the amounts of co-catalyst compound concentrations within the catalyst composition; polymers having a wide range of molecular weights can be produced in this manner. In general, increasing the metallic complex and co-catalyst concentrations reduces the molecular weight of resulting polymers, although very low molecular weight polymers (e.g., liquid polydienes) require extremely high catalyst concentrations. Typically, this necessitates removal of catalyst residues from the polymer to avoid adverse effects such as retardation of the sulfur cure rate.

A catalyst composition that includes a Group 3 metal atom-containing compound can be formed using any of the following methods:

(1) In situ. The catalyst ingredients are added to a solution containing monomer and solvent (or simply bulk monomer). The addition can occur in a stepwise or simultaneous manner. In the case of the latter, the activator preferably is added first followed by the Group 3 metal atom-containing compound.

(2) Pre-mixed. The ingredients can be mixed outside the polymerization system, generally at a temperature of from about −20° to ~80° C., before being introduced to the monomer(s).

(3) Pre-formed in the presence of monomer(s). The catalyst ingredients are mixed in the presence of a small amount of monomer(s) at a temperature of from about −20° to ~80° C. The amount of monomer(s) can range from ~1 to ~500 moles, commonly from ~5 to ~250 moles, typically from ~10 to ~100 moles, per mole of the Group 3 metal atom-containing compound. The resulting catalyst composition is added to the remainder of the monomer(s) to be polymerized.

(4) Two-stage procedure.

(a) The activator is combined with the Group 3 metal atom-containing compound in the absence of monomer or in the presence of a small amount of monomer(s) at a temperature of from about −20° to ~80° C.

(b) The foregoing mixture and the remaining components are charged in either a stepwise or simultaneous manner to the remainder of the monomer(s) to be polymerized.

When a solution of one or more of the catalyst ingredients is prepared outside the polymerization system in the foregoing methods, an organic solvent or carrier preferably is employed; useful organic solvents include those mentioned previously. In other embodiments, one or more monomers can be used as a carrier or the catalyst ingredients can be employed neat, i.e., free of any solvent of other carrier.

Where 1,3-butadiene is polymerized in the presence of a catalyst composition of the type just described, the resulting polydienes can have a cis-1,4-linkage content of at least 95%, at least 96%, at least 97%, at least 98%, or at least 99%, where the percentages are based upon the number of diene mer in cis-1,4 configuration relative to the total number of diene mer. As mentioned previously, such polymers can have a 1,2-linkage content that is less than 5%, less than 4%, less than 3%, less than 2% or even less than 1%. (The remaining diene mer will have a trans-1,4 configuration.)

Surprisingly, inclusion of a general formula (I)-type compound, particularly one where R is other than H, in the catalyst composition can increase the cis-1,4-linkage content of the resulting polymer. Specifically, inclusion of such a compound in a catalyst composition can result in a polydiene that has a cis-1,4-linkage content even higher than that produced by a similar catalyst composition not including it. The amount of increase can be as high as 0.5, 1, 1.5, 2, 2.5, 3, 3.5 or even 4 percentage points, depending primarily on the amount of cis-1,4 configured mer otherwise produced by the particular equivalent catalyst composition.

Alternatively, as shown in the examples below, a general formula (I)-type compound need not be added to a pre-formed catalyst composition but, instead, can be added as a separate component of the polymerization system in which a catalyst composition is employed.

The variable R in general formula (I) represents H or a functional group in which a C or Si atom is bonded to the ring N atom. Where the general formula (I) compound involves a N—C bond, the R group can be aliphatic, cycloaliphatic or aromatic, non-limiting examples of which include $C_1$-$C_8$ alkyl groups (optionally including one or more heteroatom or heteroatom-containing substituents) and substituted or unsubstituted aryl groups including phenyl and benzyl. Where the general formula (I) compound involves a N—Si bond, the R group can be a silyl group that includes hydrocarbyl and/or oxyhydrocarbyl groups; a specific, non-limiting example of this is a trialkylsilyl group such as trimethylsilyl.

The foregoing is distinct from the teaching of U.S. Pat. No. 7,902,309, which describes a catalyst composition that can include, inter alia, 4-hydroxymorpholine. That compound, which involves a N—O bond, is the subject of comparative examples below.

In one or more embodiments, some or all of the catalyst composition can be supported on an inert carrier. The support can be a porous solid such as talc, a sheet silicate, an inorganic oxide or a finely divided polymer powder. Suitable inorganic oxides are oxides of elements from any of Groups 2-5 and 13-16. Exemplary supports include $SiO_2$, aluminum oxide, and also mixed oxides of the elements Ca, Al, Si, Mg or Ti and also corresponding oxide mixtures, Mg halides, styrene/divinylbenzene copolymers, polyethylene or polypropylene.

The production of polymers such as cis-1,4-polydiene (or interpolymers that include cis-1,4-diene mer) is accomplished by polymerizing conjugated diene monomer(s) in the presence of a catalytically effective amount of a catalyst composition as described above. The total catalyst concentration to be employed in the polymerization mass depends on the interplay of multiple factors such as the purity of ingredients, the polymerization temperature, the polymerization rate and conversion desired, and the molecular weight desired. Accordingly, a specific total catalyst concentration cannot be definitively set forth except to say that catalytically effective amounts of the respective catalyst ingredients should be used. The amount of the Group 3 metal atom-containing compound used generally ranges from ~0.005 to ~2 mmol, commonly from ~0.01 to ~1 mmol, typically from ~0.02 to ~0.5 mmol per 100 g monomer. All other ingredients generally can be added in amounts based on the amount of Group 3 metal atom-containing compound; see the various ratios set forth above.

Polymerization preferably is carried out in one or more organic solvents of the type(s) set forth above, i.e., as a solution polymerization (where both the monomer(s) and the polymers formed are soluble in the solvent) or precipitation polymerization (where the monomer is in a condensed phase but the polymer products are insoluble). The catalyst ingredients preferably are solubilized or suspended in the organic liquid, and additional solvent (beyond that used in preparing the catalyst composition) usually is added to the polymerization system; the additional solvent(s) may be the same as or different from the solvent(s) used in preparing the catalyst composition. In one or more embodiments, the solvent content of the polymerization mixture may be more than 20%, more than 50%, or even more than 80% (by wt.) of the total weight of the polymerization mixture. The concentration of monomer present at the beginning of the polymerization generally ranges from ~3 to ~80%, commonly from ~5 to ~50%, and typically from ~10% to ~30% (by wt.).

In certain embodiments, a bulk polymerization system that includes no more than a minimal amount of solvent can be used, i.e., a bulk polymerization process where one or more of the monomers act(s) as the solvent; examples of potentially useful bulk polymerization processes are disclosed in U.S. Pat. No. 7,351,776. In a bulk polymerization, the solvent content of the polymerization mixture may be less than ~20%, less than ~10%, or even less than ~5% (by wt.) of the total weight of the polymerization mixture. The polymerization mixture even can be substantially devoid of solvent, i.e., contain less than that amount of solvent which otherwise would have an appreciable impact on the polymerization process.

The polymerization can be conducted in any of a variety of reaction vessels. For example, solution polymerizations can be conducted in a conventional stirred-tank reactor. Bulk polymerizations also can be conducted in a stirred-tank reaction if the monomer conversion is less than ~60%. Where monomer conversion is higher than ~60%, which typically results in a highly viscous polymer cement (i.e., mixture of solvent, polymers and any remaining monomer (s)), bulk polymerization can be conducted in an elongated reactor in which the viscous cement is driven by, for example, piston or self-cleaning single- or double-screw agitator.

All components used in or during the polymerization can be combined in a single vessel (e.g., a stirred-tank reactor), and the entirety of the polymerization process can be conducted in that vessel. Alternatively, two or more of the ingredients can be combined outside the polymerization vessel and transferred to another vessel where polymerization of the monomer(s), or at least a major portion thereof, can be conducted.

The polymerization can be carried out as a batch, continuous, or semi-continuous process. The conditions under which the polymerization proceeds can be controlled to maintain the temperature of the polymerization mixture in a range of from −10° to ~200° C., commonly from ~0° to ~150° C., and typically from ~20° to ~100° C. Heat generated by the polymerization can be removed by external cooling by a thermally controlled reactor jacket and/or internal cooling (by evaporation and condensation of the monomer through use of a reflux condenser connected to the reactor). Also, conditions may be controlled to conduct the polymerization under a pressure of from ~0.01 to ~5 MPa, commonly from ~0.05 to ~3 MPa, typically from ~0.1 to ~2 MPa; the pressure at which the polymerization is carried out can be such that the majority of monomers are in the liquid phase. In these or other embodiments, the polymerization mixture may be maintained under anaerobic conditions, typically provided by an inert protective gas such as $N_2$, Ar or He.

Regardless of whether a batch, continuous, or semi-continuous process is employed, the polymerization preferably is conducted with moderate to vigorous agitation.

The described polymerization process results in polymer chains that possess reactive (pseudo-living) terminals, which can be further reacted with one or more functionalizing agents so as to provide a polymer with a terminal functionality. These types of polymers can be referred to as functionalized and are distinct from a propagating chain that has not been similarly reacted. In one or more embodiments, reaction between the functionalizing agent and the reactive polymer can proceed via an addition or substitution reaction.

The terminal functionality can be reactive or interactive with other polymer chains (propagating and/or non-propagating) or with other materials in a rubber compound such as particulate reinforcing fillers (e.g., carbon black). As described above, enhanced interactivity between a polymer and particulate fillers in rubber compounds improves the mechanical and dynamic properties of resulting vulcanizates. For example, certain functionalizing agents can impart a terminal functionality that includes a heteroatom to the polymer chain; such a functionalized polymer can be used in rubber compounds from which vulcanizates can be provided, and that vulcanizates can possess high temperature (e.g., 50° C.) hysteresis losses (as indicated by a reduction in high temperature tan δ values) that are less than those possessed by vulcanizates prepared from similar rubber compounds that do not include such functionalized polymers. Reductions in high temperature hysteresis loss can be at least 5%, at least 10%, or even at least 15%.

The functionalizing agent(s) can be introduced after a desired monomer conversion is achieved but prior to introduction of a quenching agent (a compound with a protic H atom) or after the polymerization mixture has been partially quenched. The functionalizing agent can be added to the polymerization mixture after a monomer conversion of at least 5%, at least 10%, at least 20%, at least 50%, or at least 80%. In certain embodiments, the functionalizing agent is added after complete, or substantially complete, monomer conversion. In particular embodiments, a functionalizing agent may be introduced to the polymerization mixture immediately prior to, together with, or after the introduction of a Lewis base as disclosed in U.S. Pat. No. 8,324,329.

Useful functionalizing agents include compounds that, upon reaction, provide a functional group at the end of a polymer chain without joining two or more polymer chains together, as well as compounds that can couple or join two or more polymer chains together via a functional linkage to form a single macromolecule. The ordinarily skilled artisan is familiar with numerous examples of terminal functionalities that can be provided through this type of post-polymerization functionalization with terminating reagents, coupling agents and/or linking agents. For additional details, the interested reader is directed to any of U.S. Pat. Nos. 4,015,061, 4,616,069, 4,906,706, 4,935,471, 4,990,573, 5,064,910, 5,153,159, 5,149,457, 5,196,138, 5,329,005, 5,496,940, 5,502,131, 5,567,815, 5,610,227, 5,663,398, 5,567,784, 5,786,441, 5,844,050, 6,812,295, 6,838,526, 6,992,147, 7,153,919, 7,294,680, 7,642,322, 7,671,136, 7,671,138, 7,732,534, 7,750,087, 7,816,483, 7,879,952, 7,902,309, 8,063,153, 8,088,868, 8,183,324, 8,642,706, etc., as well as references cited in these patents and later publications citing these patents. Specific exemplary functionalizing compounds include metal halides (e.g., $SnCl_4$, $R_3^3SnCl$, $R_2^3SnCl_2$, $R^3SnCl_3$), metalloid halides (e.g., $SiCl_4$), carbodiimides, ketones, aldehydes, esters, quinones, N-cyclic amides, N,N'-disubstituted cyclic ureas, cyclic amides, cyclic ureas, Schiff bases, iso(thio)cyanates, metal ester-carboxylate complexes (e.g., dioxtyltin bis(octylmaleate), 4,4'-bis(diethylamino) benzophenone, alkyl thiothiazolines, alkoxysilanes (e.g., $Si(OR^3)_4$, $R^3Si(OR^3)_3$, $R_2^3Si(OR^3)_2$, etc.), cyclic siloxanes, alkoxystannates, and mixtures thereof. (In the foregoing, each $R^3$ independently is a $C_1$-$C_{20}$ alkyl group, $C_3$-$C_{20}$ cycloalkyl group, $C_6$-$C_{20}$ aryl group, or $C_7$-$C_{20}$ aralkyl group.) Commonly used exemplary functionalizing compounds include $SnCl_4$, tributyl tin chloride, dibutyl tin dichloride, and 1,3-dimethyl-2-imidazolidinone.

The amount of functionalizing agent added to the polymerization mixture can depend on various factors including the amount of Group 3 metal atom-containing compound used, the type of functionalizing agent, the desired level of functionality, etc. In one or more embodiments, the amount of functionalizing agent may be in a range of from ~1 to ~200 moles, commonly from ~5 to ~150 moles, and typically from ~10 to ~100 moles per mole of Group 3 metal atom-containing compound.

Because reactive polymer chains slowly self-terminate at high temperatures, the functionalizing agent can be added to the polymerization mixture when or soon after a peak polymerization temperature is observed or, at least in some embodiments, within 30±10 minutes thereafter. Reaction of these types of compounds with a terminally active polymer can be performed relatively quickly (a few minutes to a few hours) at moderate temperatures (e.g., 0° to 75° C.).

The functionalizing agent can be introduced to the polymerization mixture at a location (e.g., within a vessel) where the polymerization, or at least a portion thereof, has been conducted or at a location distinct therefrom. For example, the functionalizing agent can be introduced to the polymerization mixture in downstream vessels including downstream reactors or tanks, in-line reactors or mixers, extruders, or devolatilizers.

Although not mandatory, if desired, quenching can be performed to inactivate any residual reactive copolymer chains and the catalyst composition. Quenching can be conducted by stirring the polymer and an active hydrogen-containing compound, such as an alcohol or acid, for up to ~120 minutes at temperatures of from 25° to ~150° C. In some embodiments, the quenching agent can include a polyhydroxy compound as disclosed in U.S. Pat. No. 7,879,958. An antioxidant such as 2,6-di-t-butyl-4-methylphenol (BHT) may be added along with, before, or after the addition of the quenching agent; the amount of antioxidant employed can be from ~0.2 to 1% (by wt.) of the polymer product. The quenching agent and the antioxidant can be added neat or, if necessary, dissolved in a hydrocarbon solvent or liquid monomer prior to being added to the polymerization mixture.

Once polymerization, functionalization (if any) and quenching (if any) are complete, the various constituents of the polymerization mixture can be recovered. Unreacted monomers can be recovered from the polymerization mixture by, for example, distillation or use of a devolatilizer. Recovered monomers can be purified, stored, and/or recycled back to the polymerization process.

The polymer product can be recovered from the polymerization mixture using known techniques. For example, the polymerization mixture can be passed through a heated screw apparatus, such as a desolventizing extruder, in which volatile substances (e.g., low boiling solvents and unreacted monomers) are removed by evaporation at appropriate temperatures (e.g., ~100° to ~170° C.) and under atmospheric or sub-atmospheric pressure. Another option involves steam desolvation followed by drying the resulting polymer crumbs in a hot air tunnel. Yet another option involves recovering the polymer directly by drying the polymerization mixture on a drum dryer. Any of the foregoing can be combined with coagulation with water, alcohol or steam; if coagulation is performed, oven drying may be desirable.

Recovered polymer can be grafted with other monomers and/or blended with other polymers (e.g., polyolefins) and additives to form resin compositions useful for various applications. The polymer, regardless of whether further reacted, is particularly suitable for use in the manufacture of various tire components including, but not limited to, tire treads, sidewalls, subtreads, and bead fillers. It also can be used as a compatibilizer for elastomeric blends and/or used in the manufacture of hoses, belts, shoe soles, window seals, other seals, vibration damping rubber, and other industrial or consumer products.

When the resulting polymer is utilized in a tread stock compound, it can be used alone or blended with any conventionally employed tread stock rubber including natural rubber and/or non-functionalized synthetic rubbers such as, e.g., one or more of homo- and interpolymers that include just polyene-derived mer units (e.g., poly(butadiene), poly (isoprene), and copolymers incorporating butadiene, isoprene, and the like), SBR, butyl rubber, neoprene, EPR, EPDM, NBR, silicone rubber, fluoroelastomers, ethylene/acrylic rubber, EVA, epichlorohydrin rubbers, chlorinated polyethylene rubbers, chlorosulfonated polyethylene rubbers, hydrogenated nitrile rubber, tetrafluoroethylene/propylene rubber and the like. When a functionalized polymer(s) is blended with conventional rubber(s), the amounts can vary from ~5 to ~99% of the total rubber, with the conventional rubber(s) making up the balance of the total rubber.

Amorphous silica ($SiO_2$) can be utilized as a filler. Silicas are generally classified as wet-process, hydrated silicas because they are produced by a chemical reaction in water, from which they are precipitated as ultrafine, spherical particles. These primary particles strongly associate into aggregates, which in turn combine less strongly into agglomerates. "Highly dispersible silica" is any silica having a very substantial ability to de-agglomerate and to disperse in an elastomeric matrix, which can be observed by thin section microscopy.

Surface area gives a reliable measure of the reinforcing character of different silicas; the Brunauer, Emmet and Teller ("BET") method (described in *J. Am. Chem. Soc.*, vol.

60, p. 309 et seq.) is a recognized method for determining surface area. BET surface area of silicas generally is less than 450 m$^2$/g, and useful ranges of surface include from ~32 to ~400 m$^2$/g, ~100 to ~250 m$^2$/g, and ~150 to ~220 m$^2$/g.

The pH of the silica filler is generally from ~5 to ~7 or slightly over, preferably from ~5.5 to ~6.8.

Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J. M. Huber Corp. (Edison, N.J.).

Silica can be employed in the amount of 1 to 100 phr, commonly in an amount from ~5 to ~80 phr. The useful upper range is limited by the high viscosity that such fillers can impart.

Other useful fillers include all forms of carbon black including, but not limited to, furnace black, channel blacks and lamp blacks. More specifically, examples of the carbon blacks include super abrasion furnace blacks, high abrasion furnace blacks, fast extrusion furnace blacks, fine furnace blacks, intermediate super abrasion furnace blacks, semi-reinforcing furnace blacks, medium processing channel blacks, hard processing channel blacks, conducting channel blacks, and acetylene blacks; mixtures of two or more of these can be used. Carbon blacks having a surface area (EMSA) of at least 20 m$^2$/g, preferably at least ~35 m$^2$/g, are preferred; surface area values can be determined by ASTM D-1765 using the CTAB technique. The carbon blacks may be in pelletized form or an unpelletized flocculent mass, although unpelletized carbon black can be preferred for use in certain mixers.

The amount of carbon black can be up to ~50 phr, with 5 to 40 phr being typical. When carbon black is used with silica, the amount of silica can be decreased to as low as ~1 phr; as the amount of silica decreases, lesser amounts of the processing aids, plus silane if any, can be employed.

Elastomeric compounds typically are filled to a volume fraction, which is the total volume of filler(s) added divided by the total volume of the elastomeric stock, of ~25%; accordingly, typical (combined) amounts of reinforcing fillers, i.e., silica and carbon black, is ~30 to 100 phr.

When silica is employed as a reinforcing filler, addition of a coupling agent such as a silane is customary so as to ensure good mixing in, and interaction with, the elastomer(s). Generally, the amount of silane that is added ranges between ~4 and 20%, based on the weight of silica filler present in the elastomeric compound.

Coupling agents generally include a functional group capable of bonding physically and/or chemically with a group on the surface of the silica filler (e.g., surface silanol groups) and a functional group capable of bonding with the elastomer, e.g., via a sulfur-containing linkage. Such coupling agents include organosilanes, in particular polysulfurized alkoxysilanes (see, e.g., U.S. Pat. Nos. 3,873,489, 3,978,103, 3,997,581, 4,002,594, 5,580,919, 5,583,245, 5,663,396, 5,684,171, 5,684,172, 5,696,197, etc.) and polyorganosiloxanes. An exemplary coupling agent is bis[3-(triethoxysilyl)propyl]tetrasulfide.

Addition of a processing aid can be used to reduce the amount of silane employed. See, e.g., U.S. Pat. No. 6,525,118 for a description of fatty acid esters of sugars used as processing aids. Additional fillers useful as processing aids include, but are not limited to, mineral fillers, such as clay (hydrous aluminum silicate), talc (hydrous magnesium silicate), and mica as well as non-mineral fillers such as urea and sodium sulfate. Preferred micas contain principally alumina, silica and potash, although other variants also can be useful. The additional fillers can be utilized in an amount of up to ~40 phr, typically up to ~20 phr.

Other conventional rubber additives also can be added. These include, for example, process oils, plasticizers, anti-degradants such as antioxidants and antiozonants, curing agents and the like.

All of the ingredients can be mixed using standard equipment such as, e.g., Banbury or Brabender mixers. Typically, mixing occurs in two or more stages. During the first stage (often referred to as the masterbatch stage), mixing typically is begun at temperatures of 120° to 130° C. and increases until a so-called drop temperature, typically 163°±3° C., is reached.

Where a formulation includes silica, a separate re-mill stage often is employed for separate addition of the silane component(s). This stage often is performed at temperatures similar to, although often slightly lower than, those employed in the masterbatch stage, i.e., ramping from ~90° C. to a drop temperature of ~150° C.

Reinforced rubber compounds conventionally are cured with ~0.2 to ~5 phr of one or more known vulcanizing agents such as, for example, sulfur or peroxide-based curing systems. For a general disclosure of suitable vulcanizing agents, the interested reader is directed to an overview such as that provided in Kirk-Othmer, *Encyclopedia of Chem. Tech.*, 3d ed., (Wiley Interscience, N.Y., 1982), vol. 20, pp. 365-468. Vulcanizing agents, accelerators, etc., are added at a final mixing stage. To ensure that onset of vulcanization does not occur prematurely, this mixing step often is done at lower temperatures, e.g., starting at ~60° to ~65° C. and not going higher than ~105° to ~110° C.

The preceding description has been written so that individual elements are described separately. However, unless an explicit prohibition is provided in the text, this should not be read as limiting the combinability of those individual elements; in fact, to the contrary, combinations of any such combinable elements are expressly permitted.

The following non-limiting, illustrative examples provide the reader with detailed conditions and materials that can be useful in the practice of the present invention.

EXAMPLES

Examples 1-8

4-methylmorpholine, Added to Polymerization Vessel

To a dry, 200 mL bottle purged with $N_2$ was added 5.5 mL butadiene solution (19.5% by wt. in hexane), 24.3 mL TIBA (0.68 M in hexane), and 1.28 mL 0.537 M of a neo-dymium carboxylate of Versatic™ acid (hereinafter "$NdV_3$"), followed by 1.01 mL EADC (1.02 M in hexane). This mixture was held at room temperature for ~120 seconds before being employed as a catalyst composition in the following polymerization. (This catalyst composition had a TIBA-to-Nd ratio of 24:1 and an EADC-to-Nd ratio of 3:2.)

To each of eight dry bottles purged with $N_2$ was provided 300 g of a 15.0% (by wt.) solution of 1,3-butadiene in hexane. To the bottles were added varying amounts of 4-methylmorpholine solution (0.099 M in hexane, with the amounts being provided below in Table 1) before 3.56 mL of the preformed catalyst composition from the preceding paragraph was charged into each bottle. (The amounts of 1,3-butadiene and catalyst composition resulted in 0.17 mmol $NdV_3$ metal complex per 100 g monomer in each bottle.)

The bottles were placed in a 80° C. water bath and tumbled for ~40 minutes. Each bottle then was charged with 2.6 mL 4,4'-bis(diethylamino)benzophenone (DEAB) (0.58 M in toluene) before being tumbled in a 65° C. water bath for another ~30 minutes.

The resulting polymer cements were quenched with 3 mL of isopropanol containing BHT and coagulated with isopropanol. The resulting polymers were drum dried at 120° C.

The properties of these polymers are summarized below in Table 1, with molecular weight data being obtained via GPC and microstructure values by FTIR, as described above.

TABLE 1

| Catalyst information and polymer properties for Examples 1-8 | | | | | | | | |
|---|---|---|---|---|---|---|---|---|
| | 1 | 2 | 3 | 4 | 5 | 6 | 7 | 8 |
| amount, morpholine solution (mL) | 0 | 0.39 | 0.77 | 1.16 | 1.55 | 2.32 | 3.10 | 4.64 |
| amount, morpholine (mmol) | 0 | 0.039 | 0.076 | 0.115 | 0.153 | 0.230 | 0.307 | 0.459 |
| ratio, morpholine-to-Nd (x:1) | 0 | 0.5 | 1.0 | 1.5 | 2.0 | 3.0 | 4.0 | 6.0 |
| monomer conversion (%) | 99.1 | 98.4 | 98.9 | 98.2 | 97.6 | 97.3 | 96.2 | 88.9 |
| ML1 + 4 @ 100° C. (Mooney units) | 42.7 | 37.3 | 39.7 | 35.0 | 36.5 | 32.9 | 35.3 | 30.9 |
| $t_{80}$ (sec) | 2.88 | 2.67 | 2.78 | 2.60 | 2.60 | 2.33 | 2.46 | 2.36 |
| $M_n$ (kg/mol) | 109 | 108 | 110 | 109 | 109 | 110 | 112 | 111 |
| $M_p$ (kg/mol) | 356 | 330 | 340 | 308 | 327 | 311 | 321 | 306 |
| $M_w/M_n$ | 3.26 | 3.06 | 3.08 | 2.82 | 3.00 | 2.83 | 2.86 | 2.74 |
| DEAB functionality (%) | 26.4 | 29.0 | 29.4 | 31.3 | 31.3 | 30.9 | 31.5 | 31.2 |
| vinyl (%) | 0.3 | 0.4 | 0.4 | 0.4 | 0.4 | 0.6 | 0.6 | 0.5 |
| cis-1,4 configuration (%) | 97.5 | 97.5 | 97.5 | 97.6 | 97.7 | 97.8 | 98.0 | 98.5 |
| trans-1,4 configuration (%) | 2.2 | 2.1 | 2.1 | 2.0 | 1.9 | 1.6 | 1.5 | 1.0 |

Inclusion of a substituted morpholine in the polymerization system can be seen to provide the following general trends in the data of Table 1: reduced monomer conversion (although the amount of reduction is not particularly significant until higher amounts of morpholine additive are present), slightly reduced Mooney viscosity and stress relaxation times ($t_{80}$), a reduction in peak molecular weights, reduced molecular weight distributions, higher DEAB functionalization, higher vinyl and cis-1,4 configurations and reduced trans-1,4 configurations.

Examples 9-14

4-methylmorpholine, Added to Catalyst Composition

The procedure described in Examples 1-8 was essentially repeated, with the exception that the 4-methylmorpholine was added to the catalyst composition prior to aging, and the catalyst composition was made with 0.76 mL 0.10 M $NdV_3$ and 0.57 mL EADC (0.20 M in hexane).

The properties of the resulting polymers are summarized below in Table 2.

TABLE 2

Catalyst information and polymer properties for Examples 9-14

|  | 9 | 10 | 11 | 12 | 13 | 14 |
|---|---|---|---|---|---|---|
| amount, morpholine solution (mL) | 0 | 0.77 | 1.55 | 2.32 | 3.10 | 4.64 |
| amount, morpholine (mmol) | 0 | 0.076 | 0.153 | 0.230 | 0.307 | 0.459 |
| ratio, morpholine-to-Nd (x:1) | 0 | 1.0 | 2.0 | 3.0 | 4.0 | 6.0 |
| monomer conversion (%) | 96.2 | 91.3 | 84.7 | 70.0 | 67.8 | 43.8 |
| ML1 + 4 @ 100° C. (Mooney units) | 44.0 | 40.5 | 38.7 | 36.0 | 38.3 | 34.2 |
| $t_{80}$ (sec) | 2.43 | 2.23 | 2.10 | 2.09 | 2.46 | 2.68 |
| $M_n$ (kg/mol) | 118 | 120 | 118 | 115 | 111 | 102 |
| $M_p$ (kg/mol) | 213 | 205 | 200 | 190 | 186 | 159 |
| $M_w/M_n$ | 3.02 | 2.86 | 2.83 | 3.06 | 3.11 | 3.63 |
| DEAB functionality (%) | 23.5 | 21.9 | 20.7 | 19.6 | 20.5 | 25.0 |
| vinyl (%) | 0.7 | 0.7 | 0.7 | 0.7 | 0.7 | 0.7 |
| cis-1,4 configuration (%) | 97.6 | 98.1 | 98.2 | 98.4 | 98.5 | 98.6 |
| trans-1,4 configuration (%) | 1.7 | 1.3 | 1.1 | 0.9 | 0.9 | 0.8 |

Inclusion of a substituted morpholine in a pre-made catalyst composition can be seen to provide the following general trends in the data of Table 2: reduced monomer conversion (with the amount of reduction being greater than when the morpholine compound is added to the polymerization system), slightly reduced Mooney viscosity values, higher cis-1,4 configurations and reduced trans-1,4 configurations. Unlike the situation with Table 1, no general trends in stress relaxation times, peak molecular weight values, molecular weight distribution values, DEAB functionalization and vinyl contents are apparent.

Many of the same general trends seen above in Table 1 can be seen here as well, with the exceptions of molecular weight distributions (no general trend), DEAB functionalization (lower rather than higher), and vinyl configuration (no noticeable increase).

Examples 15-20

4-ethylmorpholine, Added to Polymerization Vessel

The procedure described in Examples 1-8 was essentially repeated, with the following exceptions in connection with production of the catalyst composition:
4.3 mL rather than 5.5 mL 1,3-butadiene solution,
18.9 mL rather than 24.3 mL TIBA solution,
1.00 mL rather than 1.28 mL $NdV_3$ solution, and
0.79 mL rather than 1.01 mL EADC solution.

(The reductions in amounts were proportional, such that the component ratios set forth in Examples 1-8 were maintained.)

In the polymerization processes, 0.2 M 4-ethylmorpholine was used in place of 0.099 M 4-methylmorpholine.

The properties of the resulting polymers are summarized below in Table 3.

Examples 21-26

4-ethylmorpholine, Added to Polymerization Vessel with Halogen Source

The procedure described in Examples 15-20 was essentially repeated, with the following exceptions:
EADC was omitted from the pre-formed catalyst composition,
3.45 mL rather than 3.56 mL catalyst composition was used in the polymerizations, and
0.57 mL EADC solution (0.20 M in hexane) was added to the polymerization bottles.

The properties of the resulting polymers are summarized below in Table 4.

TABLE 3

Catalyst information and polymer properties for Examples 15-20

|  | 15 | 16 | 17 | 18 | 19 | 20 |
|---|---|---|---|---|---|---|
| amount, morpholine solution (mL) | 0 | 0.38 | 0.76 | 1.15 | 1.53 | 2.30 |
| amount, morpholine (mmol) | 0 | 0.076 | 0.152 | 0.230 | 0.306 | 0.460 |
| ratio, morpholine-to-Nd (x:1) | 0 | 1.0 | 2.0 | 3.0 | 4.0 | 6.0 |
| monomer conversion (%) | 99.8 | 96.2 | 92.0 | 86.7 | 80.2 | 68.9 |
| ML1 + 4 @ 100° C. (Mooney units) | 41.2 | 35.8 | 32.9 | 31.2 | 30.2 | 28.1 |
| $t_{80}$ (sec) | 2.59 | 2.26 | 2.14 | 2.10 | 2.09 | 2.07 |
| $M_n$ (kg/mol) | 109 | 108 | 107 | 105 | 104 | 100 |
| $M_p$ (kg/mol) | 201 | 190 | 180 | 173 | 168 | 157 |
| $M_w/M_n$ | 2.77 | 2.66 | 2.64 | 2.66 | 2.68 | 2.82 |
| DEAB functionality (%) | 26.7 | 20.5 | 19.9 | 18.9 | 18.0 | 17.0 |
| vinyl (%) | 0.7 | 0.6 | 0.6 | 0.6 | 0.6 | 0.6 |
| cis-1,4 configuration (%) | 96.9 | 97.8 | 98.0 | 98.2 | 98.3 | 98.4 |
| trans-1,4 configuration (%) | 2.4 | 1.6 | 1.4 | 1.3 | 1.1 | 1.0 |

TABLE 4

Catalyst information and polymer properties for Examples 21-26

|  | 21 | 22 | 23 | 24 | 25 | 26 |
|---|---|---|---|---|---|---|
| amount, morpholine solution (mL) | 0 | 0.38 | 0.76 | 1.15 | 1.53 | 2.30 |
| amount, morpholine (mmol) | 0 | 0.076 | 0.152 | 0.230 | 0.306 | 0.460 |
| ratio, morpholine-to-Nd (x:1) | 0 | 1.0 | 2.0 | 3.0 | 4.0 | 6.0 |
| monomer conversion (%) | 96.2 | 91.1 | 85.3 | 77.1 | 74.9 | 63.6 |
| ML1 + 4 @ 100° C. (Mooney units) | 45.8 | 40.0 | 36.8 | 34.2 | 33.8 | 31.3 |
| $t_{80}$ (sec) | 2.51 | 2.30 | 2.18 | 2.22 | 2.22 | 2.22 |
| $M_n$ (kg/mol) | 122 | 117 | 115 | 110 | 107 | 103 |
| $M_p$ (kg/mol) | 219 | 205 | 199 | 188 | 186 | 176 |
| $M_w/M_n$ | 2.65 | 2.65 | 2.71 | 2.74 | 2.80 | 2.93 |
| DEAB functionality (%) | 24.3 | 21.6 | 18.6 | 18.2 | 17.6 | 17.2 |
| vinyl (%) | 0.6 | 0.6 | 0.7 | 0.6 | 0.5 | 0.6 |
| cis-1,4 configuration (%) | 97.3 | 97.8 | 97.9 | 98.2 | 98.3 | 98.4 |
| trans-1,4 configuration (%) | 2.1 | 1.6 | 1.5 | 1.2 | 1.2 | 1.0 |

Comparing the data of Table 4 with those from Table 3, moving the halogen source from the pre-made catalyst composition to a separately added component of the polymerization system does not appear to significantly impact the properties of the resulting polymers.

Examples 27-32

Morpholine, Added to Polymerization Vessel with Halogen Source

The procedure described in Examples 21-26 was essentially repeated, with the exception that morpholine was used in place of 4-ethylmorpholine.

The properties of the resulting polymers are summarized below in Table 5.

TABLE 5

Catalyst information and polymer properties for Examples 27-32

|  | 27 | 28 | 29 | 30 | 31 | 32 |
|---|---|---|---|---|---|---|
| amount, morpholine solution (mL) | 0 | 0.38 | 0.76 | 1.15 | 1.53 | 2.30 |
| amount, morpholine (mmol) | 0 | 0.076 | 0.152 | 0.230 | 0.306 | 0.460 |
| ratio, morpholine-to-Nd (x:1) | 0 | 1.0 | 2.0 | 3.0 | 4.0 | 6.0 |
| monomer conversion (%) | 94.9 | 84.7 | 56.9 | 44.7 | 34.2 | 18.9 |
| ML1 + 4 @ 100° C. (Mooney units) | 44.5 | 68.3 | 74.1 | 78.8 | 88.6 | — |
| $t_{80}$ (sec) | 2.50 | 3.18 | 3.25 | 3.46 | 3.67 | — |
| $M_n$ (kg/mol) | 120 | 142 | 147 | 162 | 182 | 194 |
| $M_p$ (kg/mol) | 215 | 273 | 274 | 286 | 320 | 323 |
| $M_w/M_n$ | 2.72 | 3.13 | 3.28 | 3.15 | 3.07 | 2.89 |
| DEAB functionality (%) | 19.9 | 19.8 | 20.7 | 22.6 | 26.2 | 30.1 |
| vinyl (%) | 0.7 | 0.6 | 0.6 | 0.6 | 0.5 | 0.5 |
| cis-1,4 configuration (%) | 97.7 | 98.7 | 98.9 | 99.0 | 99.1 | 99.2 |
| trans-1,4 configuration (%) | 1.6 | 0.8 | 0.5 | 0.5 | 0.4 | 0.3 |

Inclusion of morpholine as an additive in the polymerization system can be seen to provide some of the same general trends seen in the data of Table 1: reduced monomer conversion, higher DEAB functionalization, higher cis-1,4 configurations and reduced trans-1,4 configurations. Noticeable differences include Mooney viscosity and stress relaxation times increasing, peak molecular weights increasing, and reductions in vinyl configuration with increasing amounts of morpholine.

Examples 33-38

4-trimethylsilymorpholine, Added to Polymerization Vessel

To a dry, 200 mL dry bottle purged with $N_2$ was added 7.2 mL butadiene solution (20.6% by wt. in hexane), 21.4 mL TIBA solution (1.03 M in hexane), and 1.71 mL of the same $NdV_3$ solution as Examples 1-8, followed by 1.35 mL of the EADC solution used in Examples 1-8. This mixture was held at room temperature for ~300 seconds before being employed as a catalyst composition in the following polymerization. (This catalyst composition had a TIBA-to-Nd ratio of 24:1 and an EADC-to-Nd ratio of 3:2.)

To each of six dry bottles purged with $N_2$ was provided 300 g of a 15.0% (by wt.) solution of 1,3-butadiene in hexane. To the bottles were added varying amounts of 4-methylsilylmorpholine solution (0.614 M in hexane, with the amounts being provided below in Table 6) before 2.64 mL of the preformed catalyst composition from the preceding paragraph was charged into each bottle. (The amounts of 1,3-butadiene and catalyst composition resulted in 0.17 mmol/phgm $NdV_3$ metal complex in each bottle.)

The bottles were placed in a 80° C. water bath and tumbled for ~40 minutes. Each bottle then was charged with 1.8 mL DEAB solution (0.66 M in toluene) before being tumbled in a 65° C. water bath for another ~30 minutes.

The resulting polymer cements were quenched, coagulated and drum dried similarly to the polymers from Examples 1-8. The properties of these polymers are summarized below in Table 6.

TABLE 6

Catalyst information and polymer properties for Examples 33-38

| | 33 | 34 | 35 | 36 | 37 | 38 |
|---|---|---|---|---|---|---|
| amount, morpholine solution (mL) | 0 | 0.12 | 0.25 | 0.37 | 0.50 | 0.75 |
| amount, morpholine (mmol) | 0 | 0.074 | 0.154 | 0.227 | 0.307 | 0.461 |
| ratio, morpholine-to-Nd (x:1) | 0 | 1.0 | 2.0 | 3.0 | 4.0 | 6.0 |
| monomer conversion (%) | 100.0 | 97.6 | 96.9 | 93.9 | 87.8 | 65.5 |
| ML1 + 4 @ 100° C. (Mooney units) | 75.7 | 66.5 | 61.4 | 59.9 | 58.6 | 60.8 |
| $t_{80}$ (sec) | 3.74 | 3.40 | 3.29 | 3.25 | 3.09 | 3.18 |
| $M_n$ (kg/mol) | 124 | 130 | 121 | 122 | 121 | 134 |
| $M_p$ (kg/mol) | 234 | 221 | 193 | 186 | 174 | 179 |
| $M_w/M_n$ | 3.30 | 3.08 | 3.08 | 3.07 | 3.29 | 3.30 |
| DEAB functionality (%) | 41.4 | 42.2 | 43.4 | 43.7 | 37.8 | 40.4 |
| vinyl (%) | 0.5 | 0.6 | 0.6 | 0.5 | 0.6 | 0.6 |
| cis-1,4 configuration (%) | 97.4 | 97.6 | 97.9 | 98.2 | 98.3 | 98.6 |
| trans-1,4 configuration (%) | 2.1 | 1.8 | 1.5 | 1.3 | 1.1 | 0.8 |

The data of Table 6 indicate, inter alia, inclusion of an alkylsilylmorpholine additive in a catalyst composition can result in polybutadienes having increased cis-1,4 and reduced trans-1,4 mer configurations.

Examples 39-43

4-phenylmorpholine, Added to Polymerization Vessel

The procedure described in Examples 33-38 was essentially repeated, with the exception that a 0.503 M solution of 4-phenylmorpholine was used in place of the 4-trimethylsilylmorpholine solution.

The properties of the resulting polymers are summarized below in Table 7. (Because the same catalyst composition used in Examples 33-38 was used here, the properties of the polymer from Example 33 can act as a control for these examples as well.)

TABLE 7

Catalyst information and polymer properties for Examples 39-43

| | 39 | 40 | 41 | 42 | 43 |
|---|---|---|---|---|---|
| amount, morpholine solution (mL) | 0.15 | 0.30 | 0.46 | 0.61 | 0.91 |
| amount, morpholine (mmol) | 0.075 | 0.151 | 0.231 | 0.307 | 0.458 |
| ratio, morpholine-to-Nd (x:1) | 1.0 | 2.0 | 3.0 | 4.0 | 6.0 |
| monomer conversion (%) | 100.0 | 97.6 | 96.9 | 93.9 | 65.5 |
| ML1 + 4 @ 100° C. (Mooney units) | 52.8 | 49.0 | 46.2 | 44.2 | 39.9 |
| $t_{80}$ (sec) | 2.78 | 2.60 | 2.42 | 2.35 | 2.21 |
| $M_n$ (kg/mol) | 119 | 122 | 120 | 119 | 118 |
| $M_p$ (kg/mol) | 182 | 175 | 168 | 173 | 149 |
| $M_w/M_n$ | 2.83 | 2.73 | 2.69 | 2.76 | 2.58 |
| DEAB functionality (%) | 39.5 | 38.1 | 33.6 | 34.7 | 32.0 |
| vinyl (%) | 0.6 | 0.6 | 0.6 | 0.5 | 0.5 |
| cis-1,4 configuration (%) | 97.6 | 97.8 | 98.0 | 98.1 | 98.3 |
| trans-1,4 configuration (%) | 1.9 | 1.6 | 1.4 | 1.4 | 1.2 |

The data of Table 7 indicate, inter alia, inclusion of an arylmorpholine additive in a catalyst composition can result in polybutadienes having increased cis-1,4 and reduced trans-1,4 mer configurations.

Examples 44-49 (Comparative)

N-hydroxymorpholine

U.S. Pat. No. 7,902,309 discusses the use of N-hydroxymorpholine as a possible additive to a catalyst composition employed in the polymerization of dienes.

N-hydroxymorpholine was synthesized according to the procedure of Example 1 from U.S. Pat. No. 7,872,007.

To a dry, 200 mL bottle purged with $N_2$ was added 4.3 mL butadiene solution (20.3% by wt. in hexane), 12.5 mL TIBA solution (1.03 M in hexane), and 1.0 mL 0.537 M $NdV_3$, followed by 0.79 mL EADC solution (1.02 M in hexane). This mixture was held at room temperature for ~120 seconds before being employed as a catalyst composition in the following polymerization. (This catalyst composition had TIBA-to-Nd and EADC-to-Nd ratios identical to those employed in Examples 1-8 above.)

To each of six dry bottles purged with $N_2$ was added sufficient hexane and a blend of 1,3-butadiene in hexane so as to provide 300 g of a 15.0% (by wt.) solution of 1,3-butadiene in hexane. To the bottles were added varying amounts of neat N-hydroxymorpholine (with the amounts being provided below in Table 8) before 2.64 mL of the preformed catalyst composition from the preceding paragraph was charged into each bottle. (The amounts of 1,3-butadiene and catalyst composition resulted in 0.17 mmol/phgm $NdV_3$ metal complex in each bottle.)

(N-hydroxymorpholine is essentially insoluble in hexane and has very limited solubility in blends of hexane and butadiene. This fact alone severely limits its ability to be a practical additive for use in commercial polymerizations.)

The polymerizations and post-polymerization processing of these bottles were identical to those set forth above in connection with Examples 1-8.

The properties of these polymers are summarized below in Table 8.

TABLE 8

| Catalyst information and polymer properties for Examples 44-49 | | | | | | |
|---|---|---|---|---|---|---|
| | 44 | 45 | 46 | 47 | 48 | 49 |
| amount, morpholine solution (μL) | 0 | 6.6 | 13.2 | 19.8 | 26.3 | 39.5 |
| amount, morpholine (mmol) | 0 | 0.077 | 0.154 | 0.231 | 0.307 | 0.462 |
| ratio, morpholine-to-Nd (x:1) | 0 | 1.0 | 2.0 | 3.0 | 4.0 | 6.0 |
| monomer conversion (%) | 99.1 | 73.9 | 37.1 | 33.9 | 14.4 | 3.8 |
| ML1 + 4 @ 100° C. (Mooney units) | 46.1 | 50.3 | 63.4 | 65.8 | — | — |
| $t_{80}$ (sec) | 2.99 | 3.42 | 4.51 | 4.83 | — | — |
| $M_n$ (kg/mol) | 108 | 111 | 115 | 111 | 125 | 78 |
| $M_p$ (kg/mol) | 165 | 139 | 164 | 160 | 271 | 354 |
| $M_w/M_n$ | 3.44 | 3.84 | 4.50 | 4.72 | 4.63 | 8.25 |
| DEAB functionality (%) | 27.6 | 18.7 | 25.4 | 22.7 | 26.5 | 17.9 |
| vinyl (%) | 0.7 | 0.7 | 0.7 | 0.7 | 0.7 | 1.1 |
| cis-1,4 configuration (%) | 97.6 | 98.5 | 98.6 | 98.6 | 98.5 | 97.4 |
| trans-1,4 configuration (%) | 1.7 | 0.8 | 0.7 | 0.7 | 0.7 | 1.1 |

Use of N-nyaroxymorpnonne results in extremely large reductions in monomer conversion at higher concentrations, almost to the point of inhibiting polymerization altogether at high concentrations. Conversely, the ability of the material to increase cis-1,4 configuration of conjugated diene mer appears to peak at low additive-to-lanthanide metal complex ratios and then reverse, i.e., it acts to increase amounts of diene mer in the trans-1,4 configuration.

That which is claimed is:

1. A catalyst composition useful for polymerizing polyenes, said composition comprising (a) a compound selected from carboxylates of Nd and organophosphates of Nd, (b) a catalyst activator, (c) a compound that comprises a halogen atom, and (d) morpholine or a substituted morpholine compound that comprises a functional ground bonded to its ring N atom via a C atom, wherein the molar ratio of (d) to (a) is from 3:1 to 6:1.

2. The catalyst composition of claim 1 wherein said functional group is aliphatic.

3. The catalyst composition of claim 1 wherein said functional group is a $C_1$-$C_8$ alkyl group which optionally comprises one or more heteroatoms or heteroatom-containing substituents.

4. The catalyst composition of claim 1 wherein said functional group comprises an aromatic moiety.

5. The catalyst composition of claim 4 wherein said aromatic moiety is a phenyl or benzyl group.

6. The catalyst composition of claim 1 wherein said catalyst activator comprises an alkylating agent, said alkylating agent comprising an aluminum atom.

7. The catalyst composition of claim 1 wherein (a) is a carboxylate of Nd that comprises a tert-alkyl group.

8. The catalyst composition of claim 1 wherein said catalyst activator is free of halogen atoms.

* * * * *